United States Patent
Cheng et al.

(10) Patent No.: US 6,898,210 B1
(45) Date of Patent: May 24, 2005

(54) SYSTEM AND METHOD FOR PROVIDING A LOCAL AREA NETWORK UTILIZING REMOTE TRANSCEIVERS

(75) Inventors: Yaqi Cheng, Smyrna, GA (US); Richard G. C. Williams, San Diego, CA (US); John R. Rosenlof, LaMesa, CA (US); A. Joseph Mueller, San Diego, CA (US)

(73) Assignee: 3Com Corporation, Marlborough, MA (US)

(*) Notice: Subject to any disclaimer, the term of this patent is extended or adjusted under 35 U.S.C. 154(b) by 975 days.

(21) Appl. No.: 09/584,650

(22) Filed: May 31, 2000

Related U.S. Application Data

(63) Continuation-in-part of application No. 09/472,383, filed on Dec. 23, 1999, now abandoned.

(51) Int. Cl.[7] .................................................. H04J 1/00
(52) U.S. Cl. ....................... 370/480; 370/463; 370/465; 370/478; 375/220; 375/222
(58) Field of Search ................................ 370/282, 295, 370/437, 454, 459, 463, 465, 478, 480, 482; 375/219, 220, 222

(56) References Cited

U.S. PATENT DOCUMENTS

| | | | | | |
|---|---|---|---|---|---|
| 5,867,528 | A | * | 2/1999 | Verbueken | 375/222 |
| 6,069,899 | A | * | 5/2000 | Foley | 370/494 |
| 6,088,386 | A | * | 7/2000 | Spruyt et al. | 375/222 |
| 6,310,909 | B1 | * | 10/2001 | Jones | 375/220 |
| 6,351,473 | B1 | * | 2/2002 | Reusens et al. | 370/480 |
| 6,434,189 | B1 | * | 8/2002 | Murphy | 375/222 |
| 6,483,869 | B1 | * | 11/2002 | DesJardins | 375/222 |

* cited by examiner

*Primary Examiner*—Dang Ton
*Assistant Examiner*—Shick Hom
(74) *Attorney, Agent, or Firm*—McDonnell Boehnen Hulbert & Berghoff LLP (57) ABSTRACT

A system and method for providing a local area network utilizing discrete multitone transceivers includes at least two discrete multitone transceivers each of which may be capable of communicating with the central office and with other discrete multitone transceivers in communication with the local area network. The local area network utilizes a set of carriers coordinated between the first discrete multitone transceiver and the second discrete multitone transceiver providing a communication link between the first discrete multitone transceiver and the second discrete multitone transceiver.

21 Claims, 10 Drawing Sheets

SYSTEM AND METHOD FOR PROVIDING A LOCAL AREA NETWORK UTILIZING REMOTE TRANSCEIVERS

CROSS-REFERENCE TO RELATED APPLICATION

This is a continuation in part of the patent application of A. Joseph Mueller, et al., Ser. No. 09/472,383 filed Dec. 23, 1999, now abandoned, entitled *Home Networking Using Existing DSL Equipment*, pending, the contents of which are incorporated by reference herein.

FIELD OF INVENTION

The present invention relates generally to the field of telecommunications and more particularly to a system and method for providing a local area network spectrally adjacent to a wide area network utilizing remote discrete multitone (DMT) transceivers.

DESCRIPTION OF RELATED ART

In telephone and digital communication systems, plain old telephone service ("POTS") has typically has been provided from a telephone company service provider's central office ("CO") located generally in the area where the subscriber resides. To carry POTS from the CO to the subscriber's location, often referred to as the customer premises, the customer premises and the CO are typically connected via a subscriber or local loop, generally a pair of ordinary copper wires.

Today, modern communication systems can provide higher speed data communications over the same copper wires that traditionally only carried POTS service. Digital Subscriber Line ("DSL") communication systems can provide homes and small businesses high-speed communication access to the Internet and other networks using copper telephone lines. The CO is typically equipped with a CO DSL modem that provides broadband DSL services such as high-speed Internet access, audio, and video services. To receive DSL services from the CO, the customer premises typically includes a DSL modem or more generally a remote transceiver ("RT") to terminate a communication link with a CO DSL modem providing high-speed communication services.

The DSL modem pair (i.e., the RT and CO DSL modems) transfers data to and from the CO preferably using communication standards set out by the American National Standards Institute ("ANSI") such as Standard T1.413, the contents of which are incorporated by reference. ANSI T1.413 specifies a standard for ADSL that is widely followed in the telecommunications industry. The RT DSL modem in connection with a DSL modem at the CO may receive data at rates up to 6.144 Mbps for asymmetric DSL ("ADSL") and even higher data rates for other DSL variants to provide continuous transmission of high bandwidth video and audio data. Because of a DSL communication system's high data rate capability and its ability to operate over ordinary copper telephone lines, DSL installations are expected to greatly increase in homes and small businesses.

A drawback of DSL, however, is that the DSL connection is typically limited to point-to-point communications between a single RT DSL modem and the CO DSL modem. Typically DSL only provides a high-speed point-to-point connection between the central office and the RT and not simultaneously with other RT DSL modems that may be operating within the same customer premises. DSL does not typically provide a multipoint service, where numerous devices share the same physical medium. As a result, it may not be possible for multiple RT modems to simultaneously share the communications link to external wide area networks, such as the Internet. Furthermore, it may not be possible for multiple RT modems to communicate between themselves within a customer premises such as in a local area network.

Thus, there is a need to provide external broadband DSL access and local area networking capabilities when DSL RT modems utilizing DMT technology coexist within a customer premises.

SUMMARY OF THE INVENTION

Described is a system and method for providing local area network capability for multiple remote transceivers located within a customer premises such as multiple RT DSL modems located within a business or household. The local area network preferably provides the interconnection of remote transceivers to communicate with other remote transceivers over the local area network utilizing DMT technology.

Preferably, external digital subscriber loop broadband access is also maintained for the customer premises devices. The local area network may operate in union with a central office offering the local area network external digital subscriber loop service or may operate without a central office.

In accordance with the present embodiments, a system for providing a local area network compatible with external, digital subscriber loop service generally includes a first DMT transceiver, a second DMT transceiver, and a set of carriers. The first and second DMT transceivers are in communication with each other utilizing a set of carriers. The set of carriers utilized in communication is determined between the first and the second DMT transceiver. The first and the second DMT transceiver may be capable of communicating with a central office thus bringing external digital subscriber loop service to the local area network.

In accordance to another aspect of the present embodiments, a system for providing a local area network compatible with external digital subscriber loop service generally includes a master DMT transceiver capable of providing a local area network timing reference, a slave DMT transceiver in communication with the master DMT transceiver for local area network communications, and a set of DMT carriers providing the local area network communication link between the master DMT and the slave DMT transceivers. The master and slave DMT transceivers preferably coordinate the set of carriers used for local area network communication.

According to another aspect of the present embodiments, the master DMT transceiver may be adapted for broadcasting a timing reference to provide slave DMT transceivers in the local area network a suitable timing reference. The connected slave DMT transceivers may utilize the local area network timing reference, derived from the master DMT transceiver or from the CO DSL modem, to reduce intercarrier interference and inter-symbol interference between the local area network communications link and the external link to the central office by adjusting the receive and transmit sampling clocks.

In accordance with another aspect of the present embodiments, a method for communicating with other DMT transceivers includes the steps of determining a DMT transceiver master/slave configuration, determining central office availability of DMT DSL service, locking DMT sample clocks, and aligning DMT transmit symbol boundaries.

In a preferred embodiment, the local area network is in communication with a switching office such as a telephone company central office. In another preferred embodiment, the local area network is not in communication with a switching office.

A system and method for providing a customer premises local area network, offering connection compatibility with a central office preferably providing external digital subscriber loop service, interconnects modems residing within the customer premises. The local area network system may be used to provide access to the external point-to-point DSL connection and/or for file transfer, printer sharing, multiple-player interactive games, digital voice, and other digital applications within the customer premises. The system and method offers connection compatibility between the customer premises local are network and an external broadband service.

The foregoing and other features and advantages of a preferred embodiment of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF AN EXEMPLARY EMBODIMENT

Figure 1:
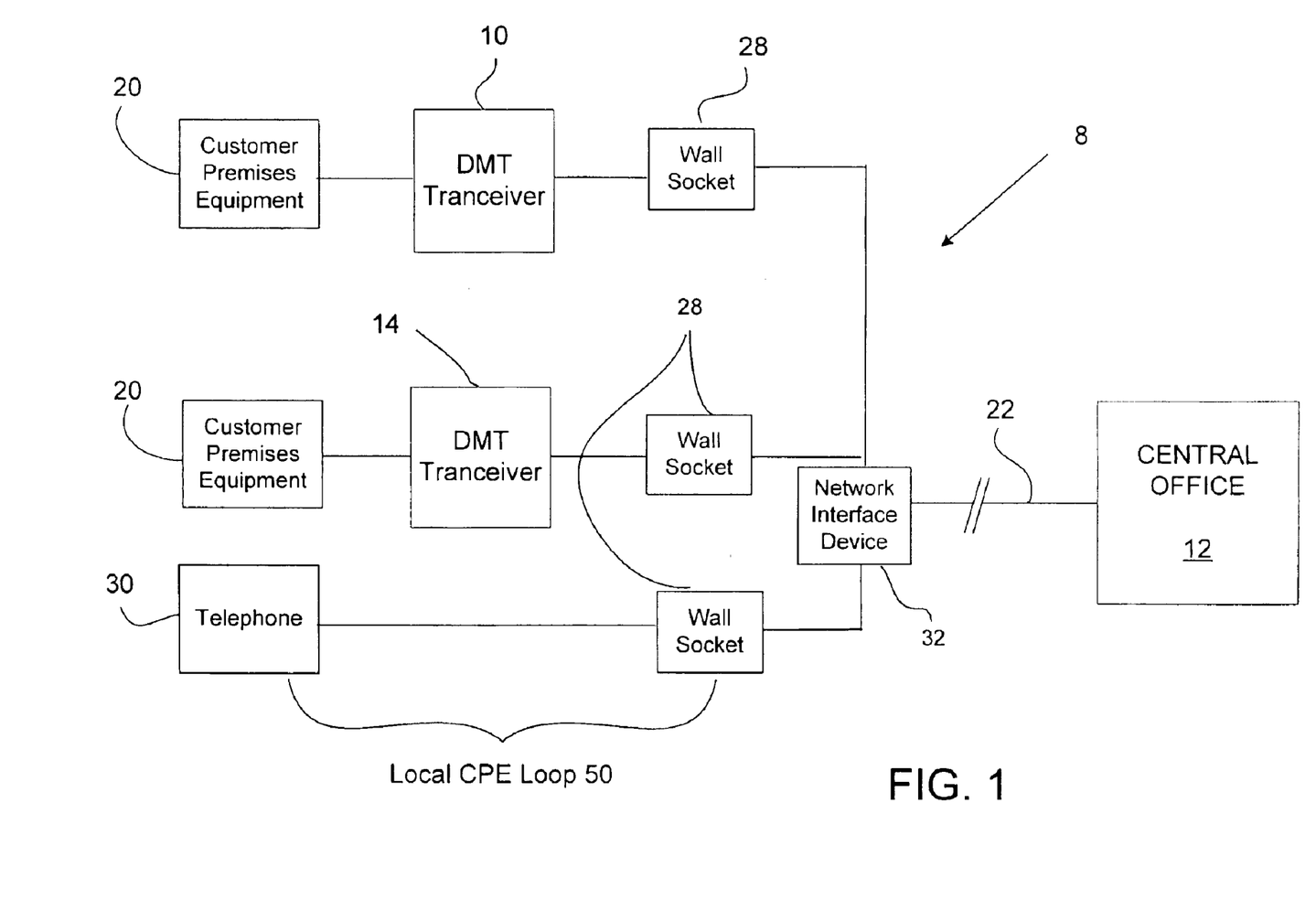
FIG. 1 is a diagram illustrating an exemplary local area network utilizing an embodiment of the present invention.

Referring to FIG. 1, shown is a diagram illustrating a local area network ("LAN") 8 in accordance with a presently preferred embodiment utilizing discrete multitone transceivers ("DMT transceivers") that may be in communication with a switching office including a central office ("CO") 12. The LAN 8 is made up of a first discrete multitone transceiver ("first DMT") 10 and a second discrete multitone transceiver ("second DMT") 14 both of which may be capable of communicating with the CO 12 and in-premises wiring ("local CPE loop") 50. The LAN 8 may be used to provide access to the external point-to-point DSL connection and/or for file transfer, printer sharing, multiple player interactive games, digital voice, and other digital applications with the customer premises.

ANSI has selected discrete multitone ("DMT") as the standardized line coding method providing a powerful and flexible transmission method. A similar standard, by the International Telecommunication Union ("ITU-T"), standard G.992.1, otherwise known as G.dmt, is also incorporated herein by reference, and provides an adjustable data rate from 32 kbps to 6.144 Mbps downstream and from 32 kbps to 640 kbps upstream. ANSI T1.413 and ITU-T G.992.1 typically require the service provider to install a signal splitter at the customer premises. Another DMT-based standard, ITU-T G.992.2, or G.Lite, specifies a splitterless ADSL standard, targeted for consumer installation and provides an adjustable data rate from 64 kbps to 1.544 Mbps downstream and from 32 kbps to 512 kbps upstream. G.Lite may become the most widely installed form of ADSL since it accommodates plain old telephone service ("POTS") without the use of a signal splitter installed at the customer premises. The contents of ITU-T G.992.2 are incorporated herein by reference.

Additional customer premises equipment ("CPE") 20 such as digital computing devices are connected to the first DMT 10 and the second DMT 14. The CPE 20 may be a personal computer or other computer peripherals such as storage devices, printers, TVs, Internet appliances etc. that digitally interface with DMT transceivers 10, 14. The first 10 and second 14 are shown connected to a wall socket 28 or plain old telephone service ("POTS") outlet providing a RJ-11 jack or similar interface connection to the local CPE loop 50. The local CPE loop 50 is connected to the subscriber loop 22 at the network interface device ("NID") 32 which provides the communications medium between the customer premises communications equipment 10, 14, 30 and the communications equipment at the central office 12. The NID 32 may also include a splitter (not shown) to provide isolation and separate voice frequencies from data frequencies. A splitter is not required for recommendation G.Lite thus allowing a splitterless connection between the customer premises equipment 10, 14, 30 and the CO 12. Although separate from the LAN 8, a telephone 30 is connected to the local CPE loop 50 to illustrate POTS service may be utilized in accordance with a preferred embodiment.

A set of DMT carriers provides a communication link between the first DMT transceiver 10 and the second DMT transceiver 14. The local CPE loop 50, commonly constructed of ordinary copper telephone wire, is capable of transmitting a multi-carrier signal and consequently a set of DMT carriers. The first DMT transceiver 10 and the second DMT transceiver 14 are typically connected through POTS outlets 28 to provide a connection to the local CPE loop 50. The local CPE loop 50 functions as a common communication access medium, which may interconnect other DMT transceivers (a third, forth etc. DMT transceiver) and also connect the first and the second DMT transceivers 10, 14 with the CO 12. It should be understood that any system employing DMT technology may be utilized regardless of communication access medium.

In an exemplary embodiment, the first DMT transceiver 10 and the second DMT transceiver 14 coordinate a set of DMT carriers utilized for data transmission between the first DMT transceiver 10 and the second DMT transceiver 14. For example, the first DMT transceiver 10 and the second DMT transceiver 14 may coordinate the usage of the frequency spectrum transmitted over the local CPE loop 50 by dividing the frequency spectrum into N discrete subchannels. The center frequency of each subchannel corresponds to the frequency of a carrier. For example, the DMT standard for ADSL, ANSI T1.413, specifies 256 carriers, each with a 4.3125 kHz bandwidth and a center frequency equal to i*4.3125 kHz where i is the carrier number and ranges from i=1 to 256. According to the preferred embodiment, the first DMT transceiver 10 and the second DMT transceiver 14 coordinate a subset of those 256 carriers, each preferably 4.3125 kHz wide, such that the set of carriers provides a communication link between the first DMT transceiver 10 and the second DMT transceiver 14. Data may then be modulated onto each carrier of the set of carriers providing a communication link between the first DMT transceiver 10 and the second DMT transceiver 14.

Additionally, more than one DMT transceiver may be connected to the local CPE loop and may communicate with the other DMT transceivers on the local area network and with the CO. Furthermore, the first and/or the second DMT transceiver may designate one of the DMT transceivers as a master DMT transceiver and the other DMT transceiver as a slave DMT transceiver. The master DMT transceiver may then broadcast a timing reference to the slave DMT transceiver if a CO is not available or not utilized.

Figure 2:
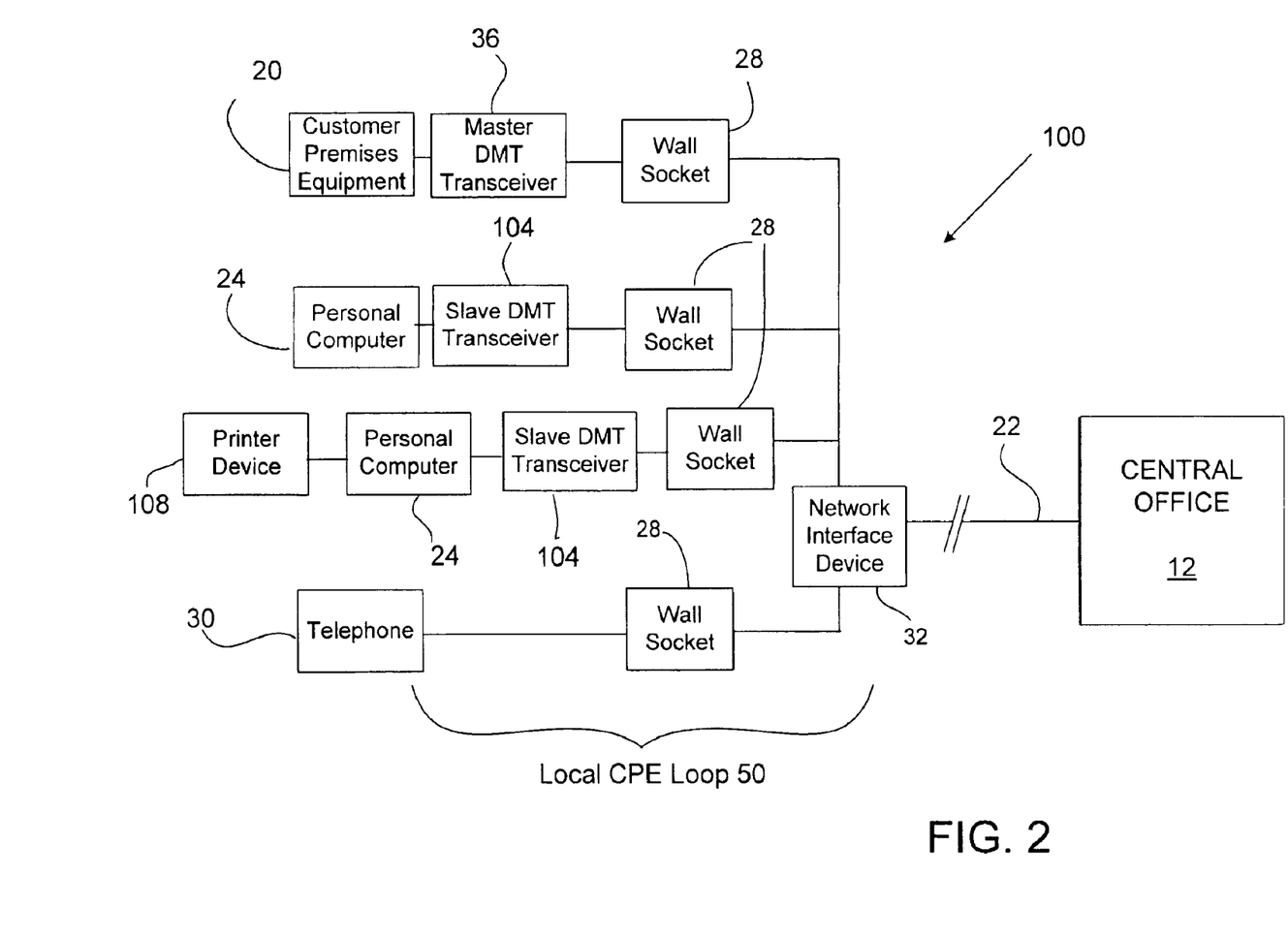
FIG. 2 is a diagram illustrating another exemplary local area network utilizing an embodiment of the present invention.

An exemplary local area network 100 shown in FIG. 2 includes a DMT transceiver designated as a master DMT transceiver 36 and two DMT transceivers designated as slave DMT transceivers 104. The designation of a master DMT transceiver 36 and a slave DMT transceiver 104 is arbitrary and may include designating any DMT transceiver to be a master DMT transceiver 36. The slave DMT transceiver 104 and/or the master DMT transceiver 36 may be connected with any device compatible with DMT transceivers, however, for the purposes of illustration a slave 104 is in communication with a personal computer 24 connected to a printer device 108. In this instance, the master 36 and slave 104 may share the printer 108 to print computer files. Coordination of a set of carriers may occur between the slaves 104 and the master 10. For example, slaves 104, configured as DMT transceivers, may transmit and receive data on carriers 128 through 255, and the master 36, configured as the master DMT transceiver, may transmit and receive data with the slaves 104 on carriers 128 through 255. Any one of the DMT transceivers connected to the local CPE loop, may transmit data to and receive data from the CO 12 on the rest of the carriers 1 through 127.

Other exemplary methods to coordinate the set of carriers amongst the slaves 104 and the master 36 may be used such as dividing the bandwidth of the subscriber loop, of which the local CPE loop 50 is a part, into different channels such that there is a downstream channel (e.g. the downstream channel may be used to transport data from the master 36 to the slaves 14, 104) and a separate upstream channel (e.g. the upstream channel may be used to transport data from the slaves 14, 104 to the master 36). Thus, there may be four distinct channels: DSL upstream and downstream (channels commonly used in standard DSL communication with the CO 12) and a LAN stream A and stream B (e.g., each LAN stream may correspond to the transmit and receive channel between any two slaves and/or master at the customer premises). If an external DSL service is not available or is not active, the LAN may extend its channels into the frequency band otherwise occupied by the external DSL service. The separation of the two DSL channels from the two LAN channels may be accomplished by methods know in the art such as through frequency division, echo cancellation, or a combination of both frequency division and echo cancellation. The separation of two LAN streams from each other may be accomplished by methods know in the art such as through frequency division, time division, echo cancellation or some combination of both frequency division and echo cancellation. It is also possible that the master 36 may determine the set of carriers without assistance from the slaves 104. A telephone 30 is shown in connection to the local CPE loop 50 illustrating that POTS service may be utilized in conjunction with the preferred embodiment.

To maintain an orthogonal local area network system 100 not presently connected to or utilizing a CO 12 DSL connection, the master 36 preferably generates and broadcasts a timing reference thus providing a local area network timing reference. The slaves 104 may use the local area network timing reference to lock their respective transmit and receive sampling clocks to the master 36 transmit clock. The local area network timing reference may be broadcast onto the local area network 100 by traditional methods such as by the use of a dedicated pilot tone embedded in the master's 36 transmitted DMT signal. A dedicated pilot tone would then occupy one of the carriers of the set of carriers used in communication between a master 36 and a slave 104. Alternatively the master might transmit pilot on bin number 64, as used in typical ADSL systems, so that the slaves may always look at the same carrier regardless of the presence of the CO 12. Other timing recovery methods may use data-aided synchronizers using a receiver's decisions or a training sequence in computing the timing estimate thus eliminating the need for a dedicated pilot tone.

Figure 3A:
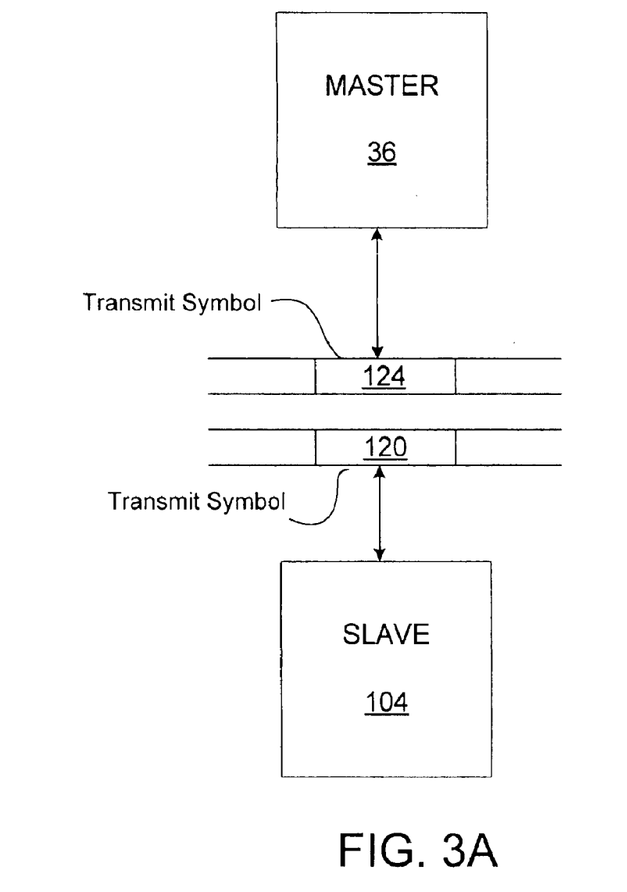
FIGS. 3A and 3B are diagrams illustrating exemplary alignment of transmit symbols in accordance with a presently preferred embodiment.
Figure 3B:
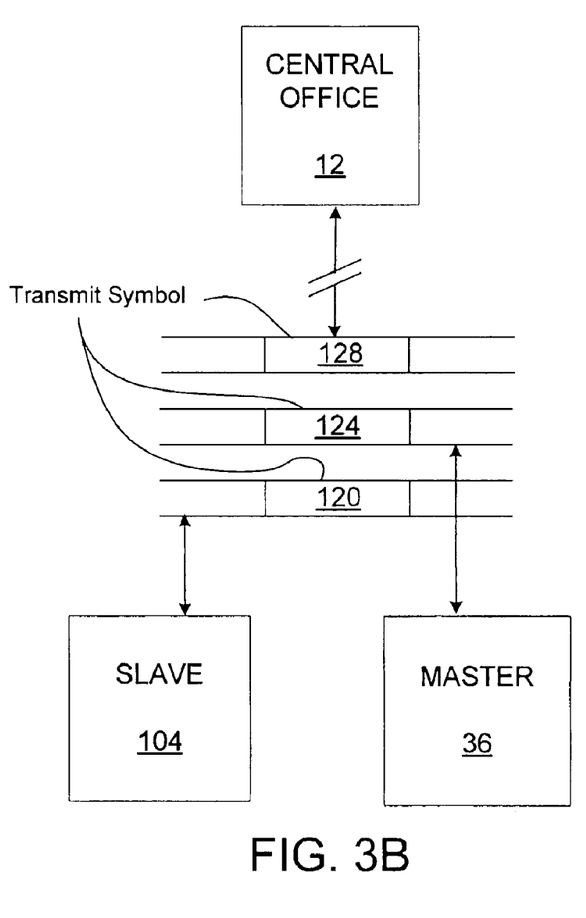

Additionally, the symbol boundaries of transmitted DMT symbols are preferably phase aligned to promote orthogonality. Referring to FIG. 3A, the slave 104 preferably aligns its transmit symbol 120 with a transmit symbol 124 received from the master 36. Referring now to FIG. 3B, the local area network is utilizing timing from a CO 12, then the master 36 preferably aligns its respective transmit symbol 124 with a received transmit symbol 128 from the CO 12, and the slave 104 preferably aligns its respective transmit symbol 120 with a received transmit symbol 124 from the master 36. Clearly the same result is obtained if the slave 104 aligns its transmit symbol 120 with a received symbol 128 from the CO 12. Thus, the transmit symbol 120 of the slave 104, the transmit symbol 124 of the master 124, and the transmit symbol 128 of the CO 12 are preferably aligned to reduce intersymbol interference. The slave 104 and master 36 may utilize conventional methods to align their respective transmit symbols 120, 124 to the transmit symbols 128 of the CO 12 such as by the use of a correlator that may detect and align symbol boundaries. The ADSL standards facilitate such symbol alignment although symbol alignment is not mandated.

Additionally, in order to maintain compatibility with the spectral masks defined for external DSL services it may be necessary to transmit signals from the slave DMT transceivers 104 at a power that is of a similar density to that of the signal received from the CO 12. This also provides an additional benefit to the master 36 since it will receive signals from the slave DMT transceivers 104 and the CO 12 at the same power density.

In an exemplary embodiment, the DMT transceivers connected to the local CPE loop are G.Lite compliant ADSL modems. It should be understood, however, that a variety of other DSL devices may be utilized. In a typical ADSL network, a DMT RT transceiver functions as an Asymmetric Digital Subscriber Line Transceiver Unit-Remote ("ATU-R") and typically communicates with an Asymmetric Digital Subscriber Line Transceiver Unit-Central Office ("ATU-C") at the CO.

Figure 4:
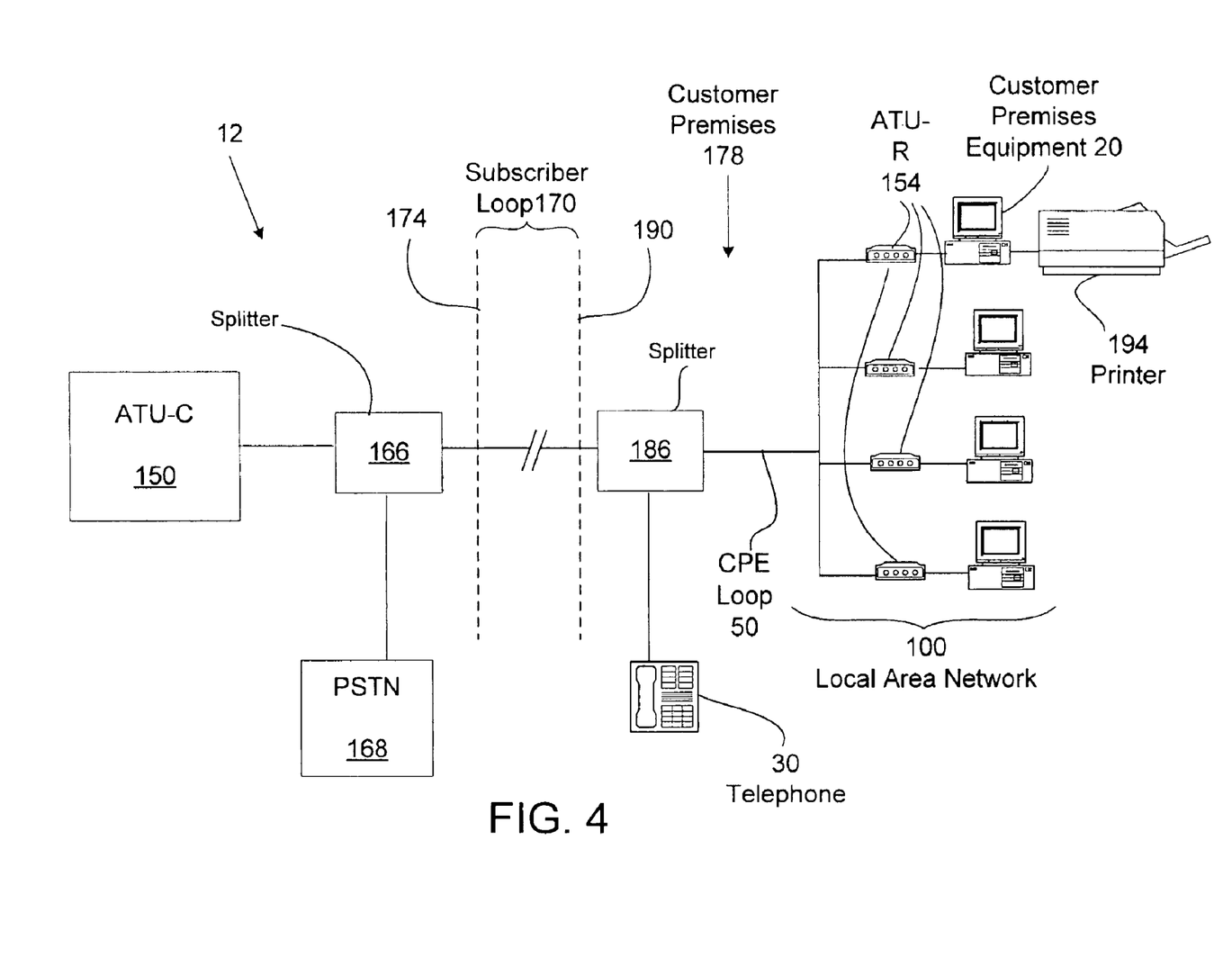
FIG. 4 is a diagram illustrating a presently preferred embodiment of a local area network system utilizing DMT transceivers.

Referring to FIG. 4, shown is a diagram illustrating an ATU-C 150 in communication with one of a plurality of ATU-Rs 154. Each ATU-R 154 may be used to connect computers 20, computer peripherals, TV's, audio equipment, less intelligent devices (appliances, thermostats, etc.) to devices and networks inside and often times outside the customer premises (e.g. the Internet). For instance, an ATU-R 154 is connected to a computer 20 and the computer 20 is connected to a printer 194.

The ATU-C 150 located at the CO 12 typically is connected to a splitter 166. The splitter 166 allows a twisted pair telephone line, referred to as the subscriber loop 170 to be used for simultaneous high-speed DSL data transmission and single line telephone service. Typically, the splitter 166 separates the high frequency signals used for DSL from the low frequency signals commonly used in connection with the Public Switched Telephone Network ("PSTN") 168. The splitter 166 at the CO 12 is connected to the subscriber loop 170, through an interface ("U-C") 174.

ATU-Rs 154 located at the customer premises 178 are preferably connected to one another by a twisted pair phone line, referred to as the local CPE loop 50, thus forming a local area network 100. The customer premises 178 may also include a splitter 186 to isolate the DSL frequencies and equipment from the POTS frequencies and equipment on the local CPE loop 50 such that greater DSL performance and less POTS degradation may be achieved. The subscriber loop 170 is connected to the local CPE loop 50 via the optional splitter 186 at the customer premises 178, through an interface ("U-R") 190. The ATU-Rs 154 at the customer premises 178 may transmit and receive DSL data over the local CPE loop 50 to and from the CO 12. Note that the splitter 186 at the customer premises 178 is not required if recommendation G.Lite is utilized. According to recommendation G.Lite, the installation of splitter 186 is optional.

Figure 5:
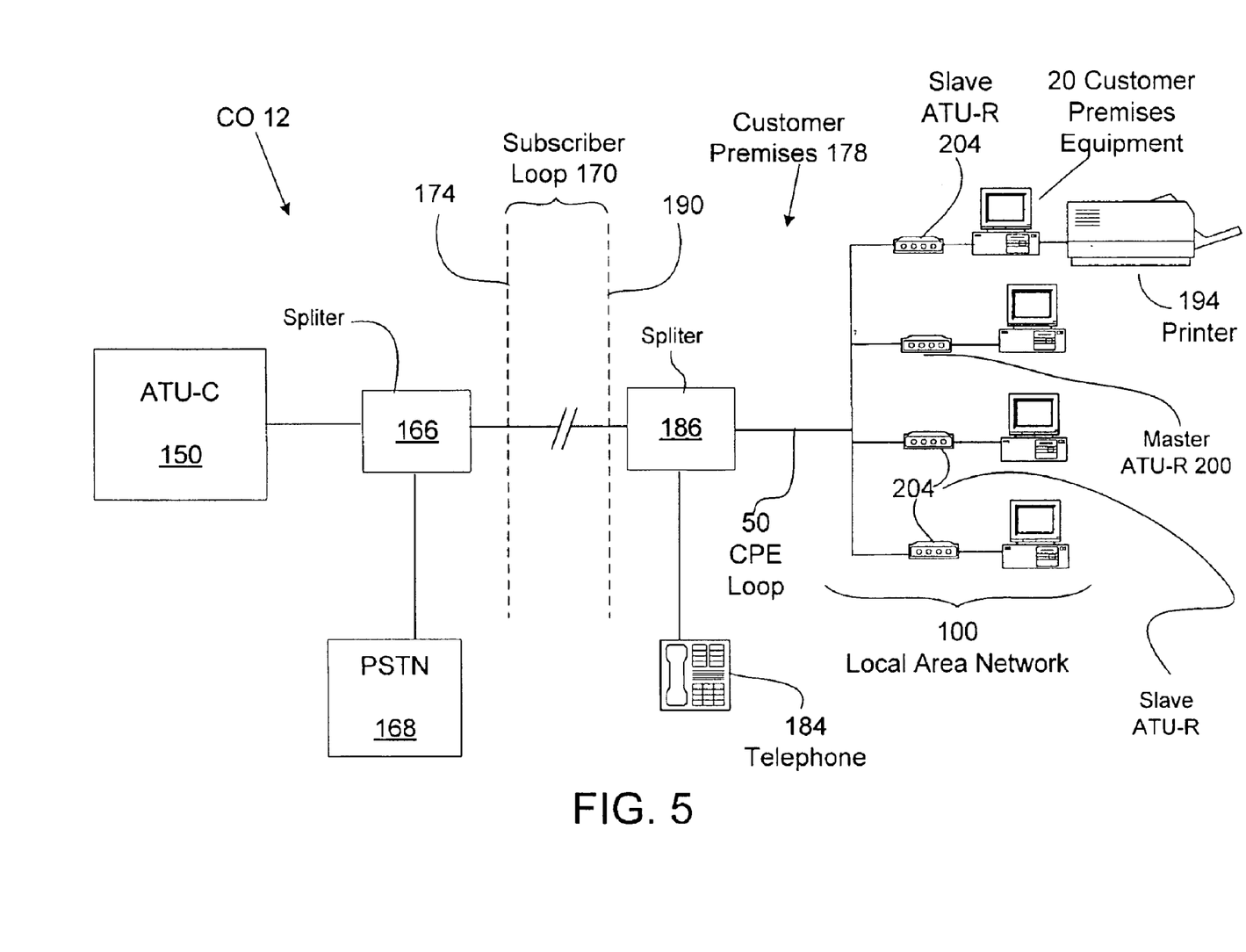
FIG. 5 is a diagram illustrating a presently preferred embodiment of a local area network utilizing a master and a slave DMT transceiver.

FIG. 5 is a diagram illustrating a preferred embodiment of a local area network 100 having one of a plurality of ATU-R's 200, 204 designated as a master ATU-R 200 and the remaining ATU-Rs designated as slave ATU-Rs 204. The master ATU-R 200 is capable of acquiring sample timing and symbol synchronization from the ATU-C 150 at the CO 12 over the conventional subscriber loop 170. The master ATU-R 200 preferably derives its timing from the ATU-C 150 and consequently transmits a local area network reference timing signal from which the remaining slave ATU-Rs 204 may acquire sample timing and symbol synchronization. Acquiring sample timing, for instance, may consist of the slaving of the sample rate of a digital to analog converter ("DAC") at the master ATU-R 200 to the sample rate of a a digital to analog converter ("DAC") at the CO 12, thus tying together the sampling frequencies of the DAC of the ATU-C 150 at the CO 12 and the DAC of the master ATU-R 200 at the customer premises 178. Sample clock frequencies utilized by the master ATU-R 200 may be locked to the sampling frequency of the ATU-C 150 by utilizing methods known in the art such as a dedicated pilot tone as specified in ANSI Standard T1.413. Alternatively, all ATU-Rs 200, 204 may acquire sample timing and symbol synchronization individually from the ATU-C 150 directly, obviating the need for a master.

Figure 6:
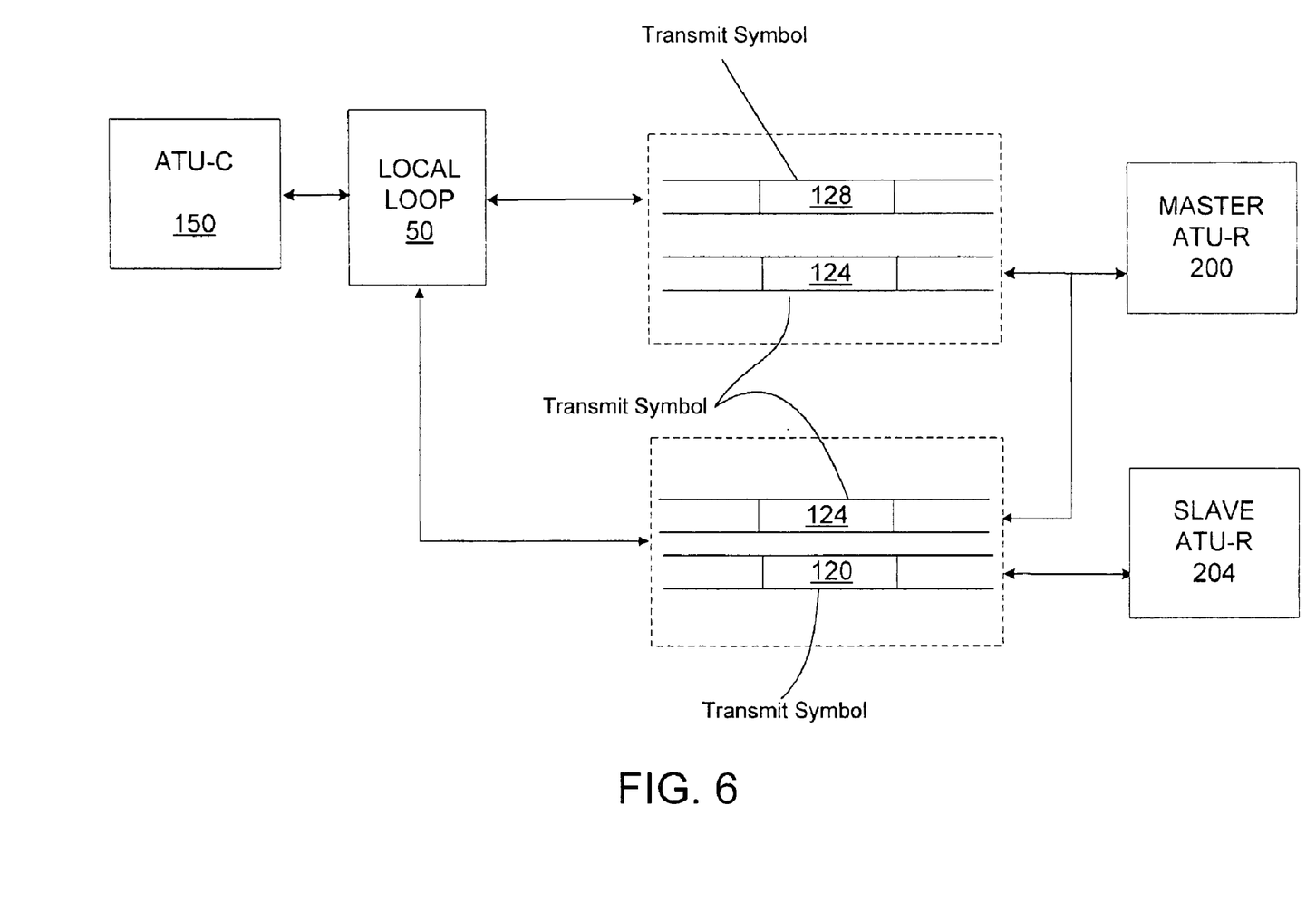
FIG. 6 is diagram illustrating an exemplary alignment of transmit symbols in accordance with a presently preferred embodiment.

FIG. 6 is a diagram illustrating an exemplary embodiment of the master ATU-R 200 and slave ATU-R 204 preferably locking the sampling frequencies and aligning transmit symbol boundaries with the ATU-C 150. The transmit symbol 124 of the master ATU-R 200 is preferably aligned with the transmit symbol 128 of the ATU-C 150 and the transmit symbol 120 of the slave ATU-R 204 is preferably aligned with the transmit symbol 124 of the master ATU-R 200 broadcast onto the local CPE loop 50, where the slave transmit symbol 120 is sent out onto the local CPE loop 50. The same result is obtained if the slave ATU-R 204 aligns its transmit symbol 120 with the transmit symbol 128 from the ATU-C 150. Thus, the transmit symbol 120 of the slave ATU-R 204, the transmit symbol 124 of the master ATU-R 200, and the transmit symbol 128 of the ATU-C 150 are preferably aligned. Symbol alignment may occur by utilizing present methods known in the art such as by use of a correlator to determine symbol boundaries. The local area network system preferably preserves orthogonality to provide minimal interference between the DSL service offered by the ATU-C 150 and the local area networking service.

Referring again to FIG. 5, the slave ATU-Rs 204 may communicate to other slave ATU-Rs 204 and/or with the master ATU-R 200. If the local CPE loop 50 is not connected to a CO 12 or the CO 12 does not have or is not utilizing an ATU-C 150, the slave ATU-R's 204 derive timing from the master ATU-R 200 and consequently transmit in a looped timing mode. However, if an ATU-C 150 at the CO 12 is present and transmitting, the master ATU-R 200 preferably derives timing directly from the ATU-C 150 such as by receiving a dedicated pilot tone and the slave ATU-R's 204 also derive timing from the ATU-C 150 and consequently transmit in a looped timing mode. A similar result can be obtained if the slave ATU-Rs 204 derive timing from the master ATU-R 200. The slave ATU-Rs 204 preferably align transmit local area networking DMT symbols with the master ATU-R 200 local area networking DMT symbols so as to maximize orthogonality. Therefore the slave ATU-Rs 204 may communicate with each other or with the master ATU-R 200 and the slave ATU-Rs 204 may communicate with the ATU-C 150 at the CO 12 via the master ATU-R 200. It may also be possible for the slave ATU-R 204 to perform loop timing and align its transmit symbols with the transmit symbols of the ATU-C 150 such as performed, preferably in the same fashion, as the master ATU-R 200.

Figures 7, 8:
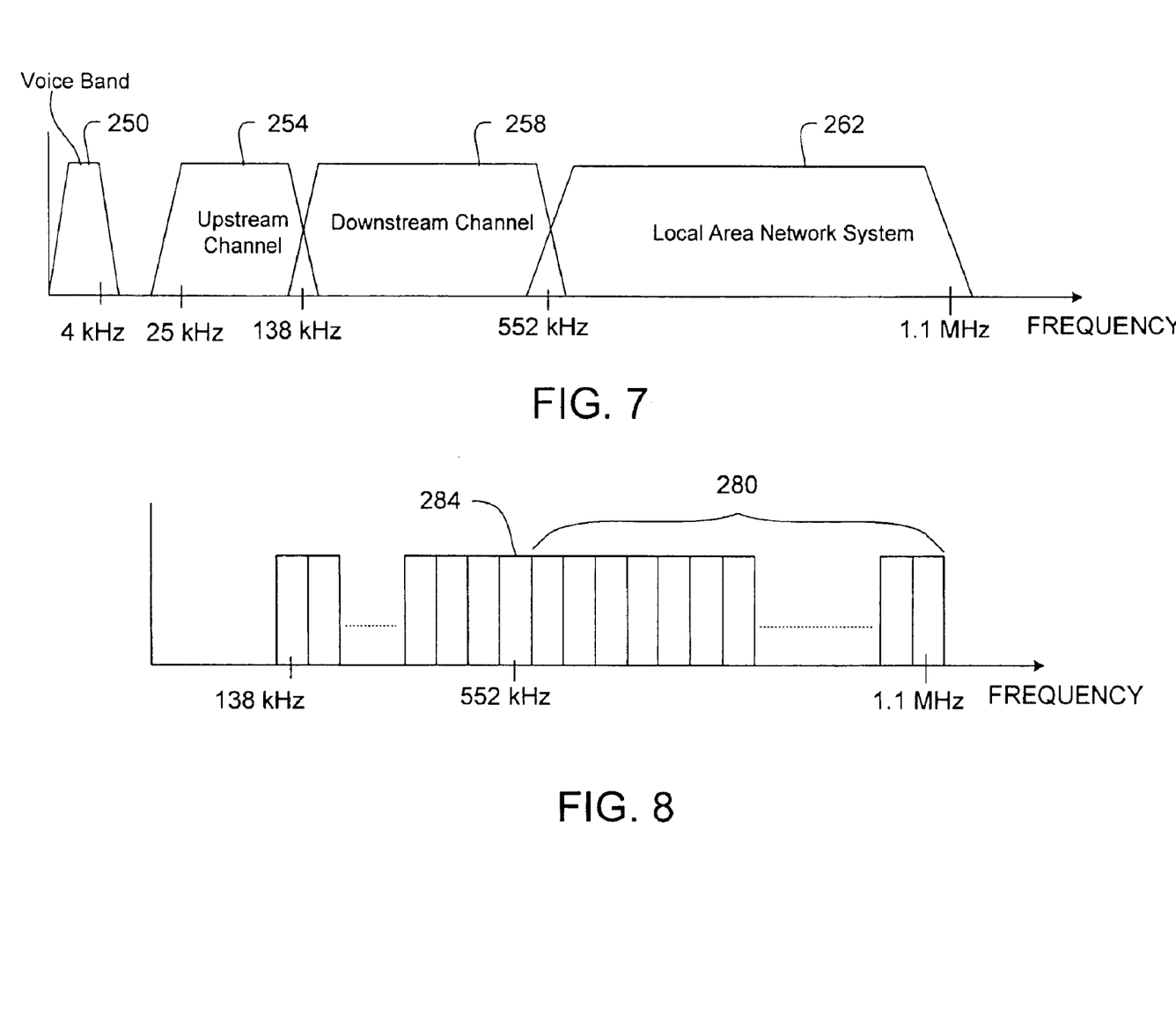
FIG. 7 is a diagram illustrating a frequency spectrum utilized in an exemplary embodiment of a local area network system.
FIG. 8 is a diagram illustrating a set of carriers utilized in a exemplary embodiment of a local area network system.

In an exemplary embodiment according to another aspect of the invention, a slave ATU-R may communicate with a master ATU-R using local area network carriers within a frequency spectrum immediately adjacent to the ADSL frequency spectrum providing a local area network communication link between the slave ADSL transceiver remote unit and the master ADSL transceiver remote unit. FIG. 7 is a diagram showing the frequency spectrum of orthogonal transmission utilized in a preferred embodiment. Plain old telephone service ("POTS") band 250 or voice band typically operates below 4 kHz. The frequency band between approximately 25 kHz and 138 kHz is preferably designated as the upstream channel 254 typically used for transmission from the master ATU-R to the ATU-C. The frequency band between approximately 138 kHz and 552 kHz is preferably designated as the downstream channel 258 typically used for transmission from the ATU-C to the master ATU-R. The frequency band 262 above 552 kHz is preferably designated for use in the local area network system. That is, the data transmission between the slave ATU-R's and between the slave ATU-R's and the master ATU-R preferably occurs using carriers having frequencies in the frequency band above 552 kHz. It should be understood that the particular values of the frequency ranges are merely exemplary and many other frequency ranges may be utilized. Furthermore, these frequency ranges may be overlapped or may be partitioned into multiple ranges and possibly interleaved. It should also be understood that the benefits of orthogonality hold even if the local area frequencies are not immediately adjacent to the DSL frequencies.

The local area network system may utilize the frequency spectrum, such as shown in FIG. 7 having carriers illustrated in FIG. 8 immediately adjacent to the ADSL frequency spectrum preferably without the use of a guardband between the ADSL frequency spectrum (254, 258 in FIG. 7) and the home network frequency spectrum (262 in FIG. 7) since the local area network maintains carrier orthogonality by aligning DMT symbol boundaries. Thus the local area network carriers 280 having frequencies immediately adjacent to the 552 kHz carrier 284 used in standard ADSL communication for example does not cause interference.

The local area network frequency band 262 above 552 kHz may be divided into subbands. The subbands may be allocated dynamically (e.g. during initialization between the master ATU-R and the slave ATU-R's) or statically (e.g. pre-determined subbands such as upstream/downstream channels) to provide communications between ATU-R devices. To divide up the band into subbands or subchannels, methods that are known in the art such as given in ANSI Standard T1.413 or ITU Standard G.Lite may be used.

Figure 9:
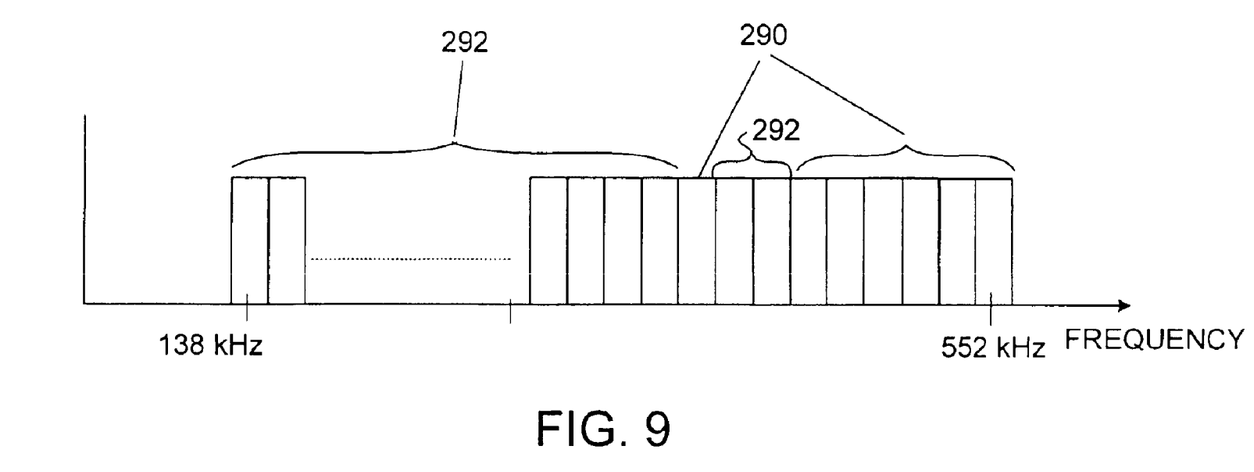
FIG. 9 is a diagram illustrating a set of carriers utilized in another exemplary embodiment of a local area network system.

Referring to FIG. 9, in a second exemplary embodiment, the slave ATU-R's communicate with one another or the master ATU-R using one or more of the carriers not used for data communication between the master ATU-R and the ATU-C. For instance, the actual number of carriers employed to modulate data between the master ATU-R and the ATU-C may be less than the maximum number of carriers allowed. The number of unused or idle carriers may be determined in the initialization between the master ATU-R and the ATU-C such as performed by a channel analysis as known in the art. Any of the unused carriers, typically having a frequency spacing of 4.3125 kHz in this example may then be used for data communication between the ATU-R's.

In the exemplary embodiment, the local area network system may utilize the available carriers 290 immediately adjacent to the ADSL carriers 292 since the local area network maintains carrier orthogonality. The carriers 290 utilized in the local area network for communication between two ATU-Rs for example do not interfere with the carriers 292 used in ADSL communication between the master ATU-R and the ATU-C. However, if the carriers 290 exit an idle mode such that the ADSL system employs those carriers, the local area networking system preferably resynchronizes the carriers utilized in the local area network for communication between the master ATU-R and the slave ATU-R or between two slave ATU-Rs.

Figure 10:
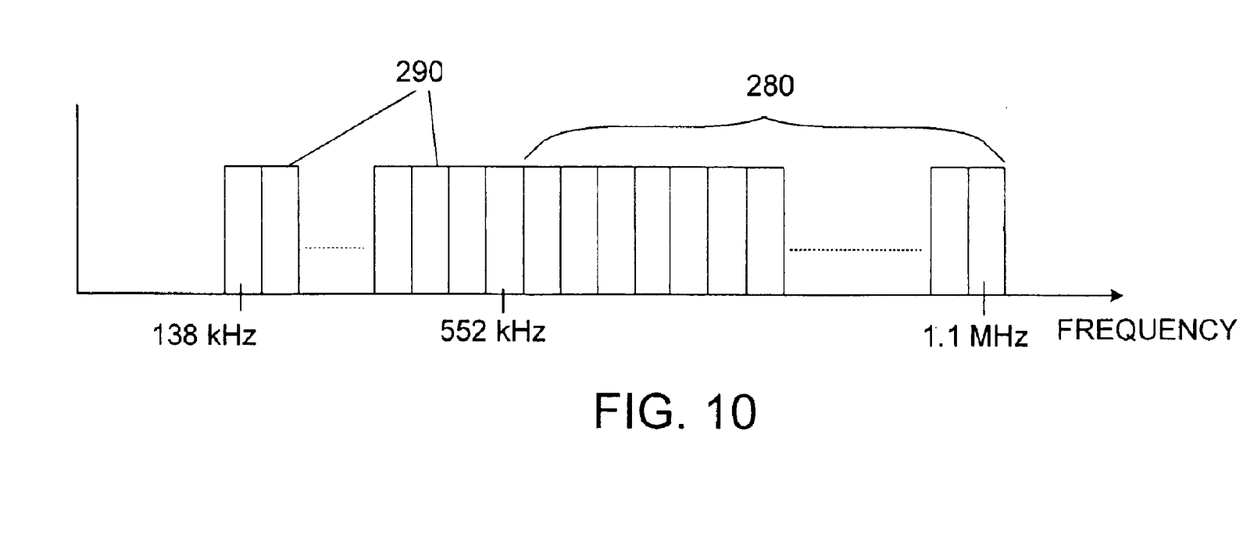
FIG. 10 is a diagram illustrating a third carrier utilization in another exemplary embodiment of a local area network system.

FIG. 10 illustrates a third exemplary embodiment such that the slave ATU-R's may utilize communication with the master ATU-R or other slave ATU-Rs using both unused carriers 290 (i.e. carriers not used in communication between the master ATU-R and the ATU-C) and/or additional carriers 280 having a center frequency above 552 kHz.

Figure 11:
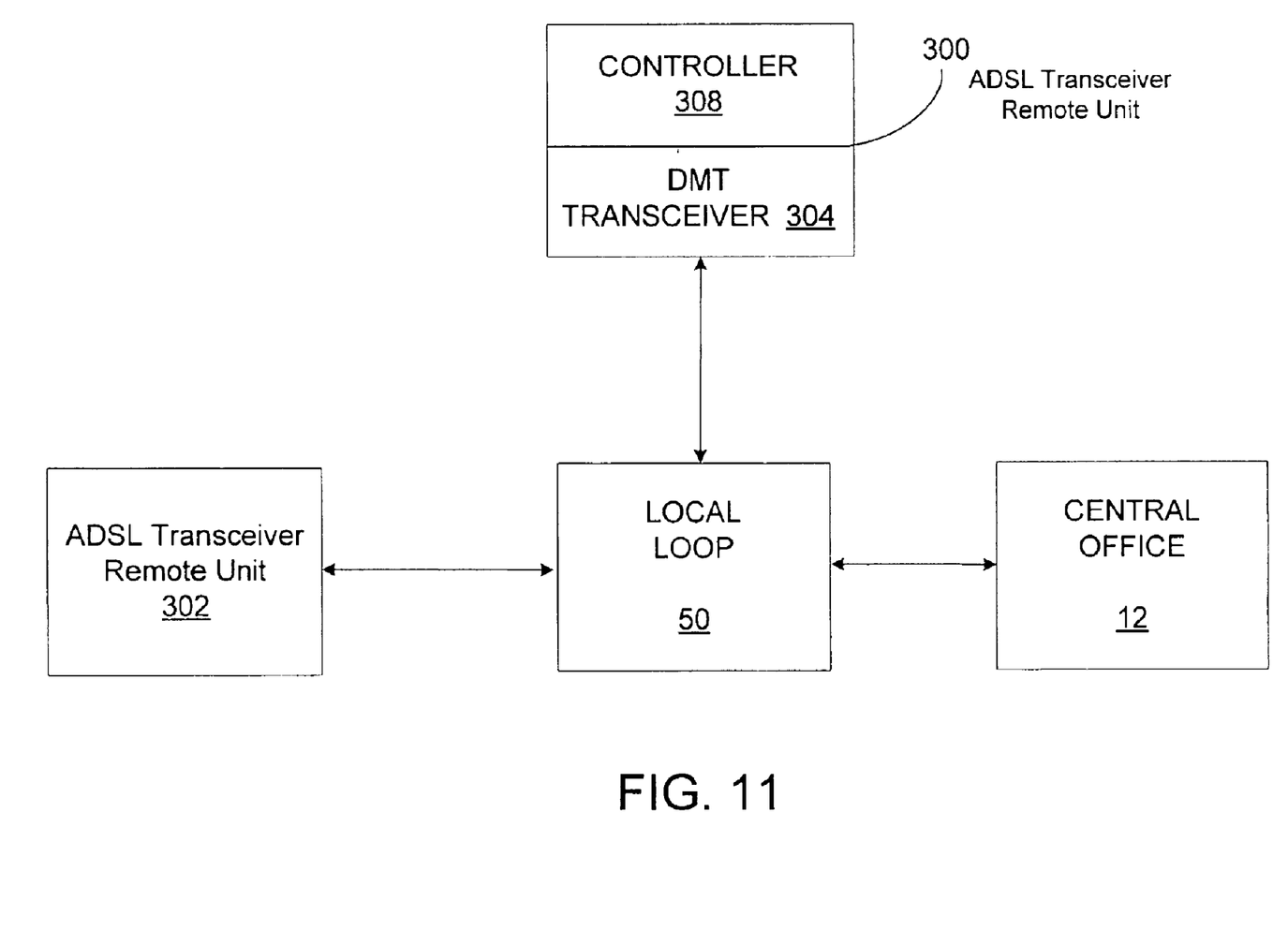
FIG. 11 is a diagram illustrating a DMT transceiver remote unit of the present invention.

Referring to FIG. 11, shown is an ADSL transceiver remote unit 300 for communicating with other ADSL transceiver remote units 302 connected to a local CPE loop 50 and connected with a central office 12. The ADSL transceiver remote unit 300 includes a DMT transceiver 304 capable of communicating with the CO 12 and with at least one other ADSL transceiver remote unit 302 and a controller 308. The DMT transceiver 304 generates and receives a time domain signal having a plurality of carriers. The controller 308 utilizing a protocol stack in connection with the DMT transceiver 304 allocates the local area network carrier frequencies utilized in communication with other ADSL transceiver remote units 302 connected to the local CPE loop 50.

The local area network carrier frequencies designated by the controller 308 may consist of frequencies immediately adjacent to carrier frequencies employed for ADSL communications. That is, during initialization between the ADSL transceiver remote unit 300 and the CO 12, certain carriers may be unused depending on channel characteristics, noise characteristics, etc. These unused channels may be designated by the controller for use by the communication link between the ADSL transceiver remote unit 300 and other ADSL transceiver remote units 302 connected to the local CPE loop 50. The controller 308 may utilize idle or unused channels since the ADSL transceiver remote unit 304 preferably provides orthogonal transmission by aligning ADSL transceiver remote unit 304 sample clocks with the ATU-C transmit clock at the CO 12 and by aligning its transmit symbols with the transmit symbols received from the ATU-C at the CO 12.

The local area network carrier frequencies designated by the controller 308 may consist of carriers having frequencies within a local area network frequency spectrum immediately adjacent to an ADSL frequency spectrum. That is, the controller 308 may designate carriers having frequencies above 552 kHz and preferably below 1.104 MHz, FIG. 7 shows the carriers 262 relative to the entire frequency spectrum. The carriers in this frequency spectrum may be utilized such that the local area network carriers will not interfere with the carriers used in the ADSL frequency spectrum. The controller 308 may utilize carriers immediately adjacent to the ADSL frequency spectrum since the ADSL transceiver remote unit provides orthogonal transmission by preferably aligning all ADSL transceiver remote unit sample clocks with the transmit clock of the ATU-C at the CO 12 and by aligning transmit symbols.

When the ATU-C at the CO 12 is not active or is unavailable, the DMT transceiver 304 provides a local area network timing reference for other ADSL transceiver remote units 302 connected to the local CPE loop 50. The local area network timing reference is broadcast using traditional methods such as by a dedicated pilot tone as specified in ANSI Standard T1.413. Other local area network timing references that also include symbol boundary information may also be utilized.

The ADSL remote unit 300 is adaptable to operate as a master ADSL transceiver remote unit or a slave ADSL transceiver remote unit. Preferably during startup, the ADSL remotes 300, 302 preferably designate a master if a master has not already been predetermined such as by inherent design of the master or the master has been programmed to be a master.

Figure 12:
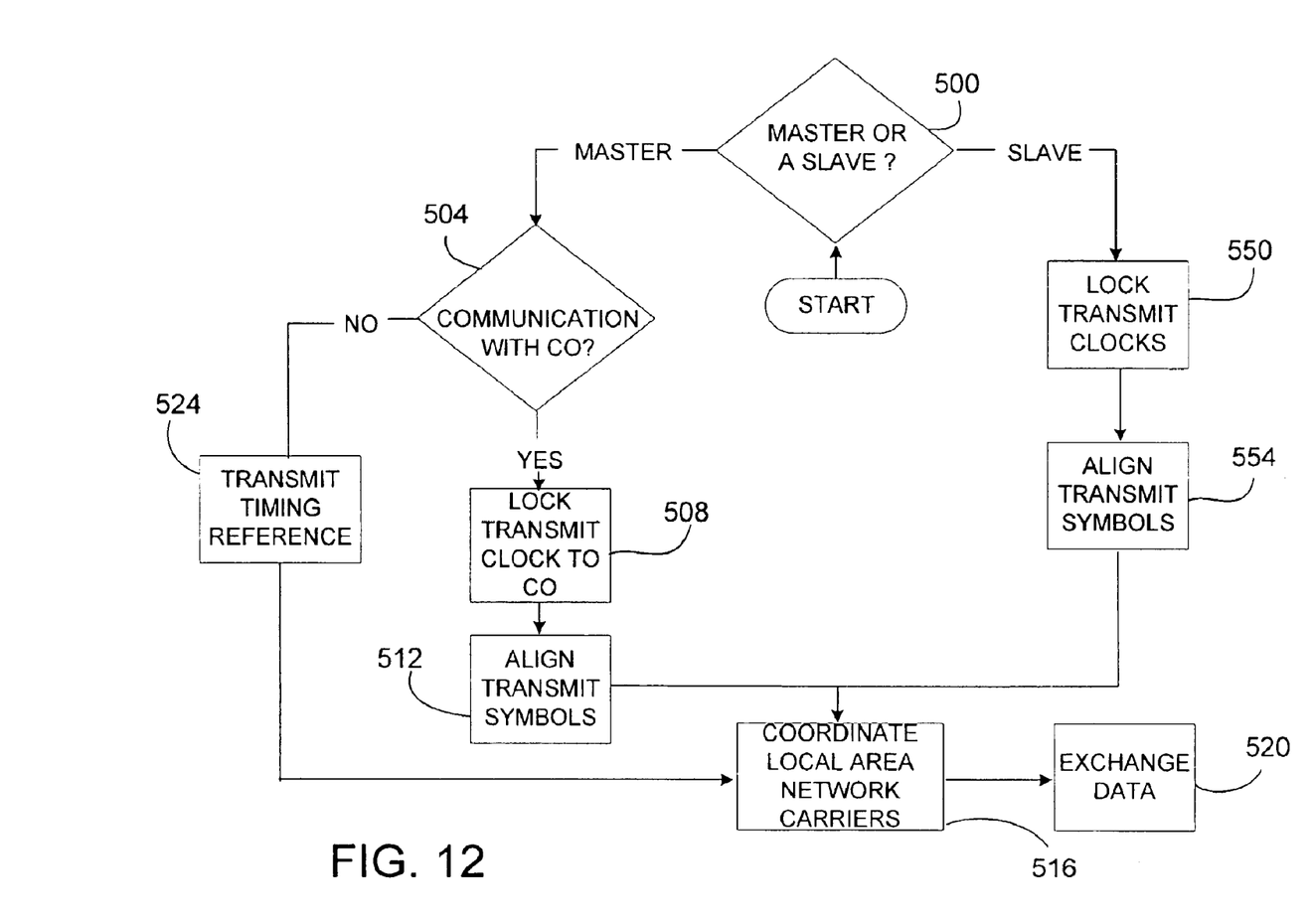
FIG. 12 is a flowchart illustrating an exemplary method utilized by a remote DMT transceiver.

FIG. 12 is a block diagram illustrating an exemplary method for communicating with other ADSL transceiver remote units while remaining compatible with ADSL service to a central office. The exemplary method includes determining if an ADSL transceiver remote unit having a DMT transceiver is a master 500, and if so, determining if there is communication with an ADSL central office unit 504, and if so, locking the transmit sampling clock of the DMT transceiver in accordance with the transmit sampling clock of the central office 508, aligning a first DMT transmit symbol of the DMT transceiver with a second DMT transmit symbol received from the central office 512 and coordinating a set of local area network carrier frequencies with the at least one other ADSL transceiver remote unit 516. Whereupon exchange of data may occur over the local CPE loop 520. Additionally, a method for communicating with other ADSL transceiver remote units while remaining compatible with ADSL service to a central office includes determining if an ADSL transceiver remote unit having a DMT transceiver is a master 500, and if so, determining if there is communication with an ADSL central office unit 504, and if not, transmitting a network timing reference providing a local area network timing reference for the at least one other ADSL transmission remote unit 524 and coordinating a set of local area network carrier frequencies with the at least one other ADSL transceiver remote unit 516. Whereupon exchange of data may occur over the local CPE loop 520. Additionally, a method for communicating with other ADSL transceiver remote units while remaining compatible with ADSL service to a central office includes determining if an ADSL transceiver remote unit having a DMT transceiver is a master 500, and if not, locking the transmit sampling clock of the DMT transceiver in accordance with a local area network timing reference received from the master ADSL transceiver remote unit 550 or from the central office 512, aligning a first DMT transmit symbol of the DMT transceiver with a second DMT transmit symbol received from the master ADSL transceiver remote unit 554 or from the central office 512 and coordinating a set of local area network carrier frequencies with the at least one other ADSL transceiver remote unit 516. Whereupon exchange of data may occur over the local CPE loop 520.

It should be understood that it is not necessary to designate a master DMT transceiver or a slave DMT transceiver. Designation of a master or a slave may occur, for instance, if a timing reference is needed in such cases if a CO is unavailable or not utilized. It should also be understood that a slave DMT transceiver may coordinate the described set carriers utilized in communication with other slave DMT transceivers and/or with the CO.

Thus the system and a method for providing a customer premises local area network compatible with external digital subscriber loop service may interconnect modems residing within the home or office to one another and with the CO. The local area network system provided herein may be used for sharing access to an external network, file transfer, printer sharing, multiple-player interactive games, digital voice, and other digital applications. The system and a method providing modems preferably utilizing DMT and exploiting DSL technology offers connection compatibility between the customer premises local area network and an external broadband service.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

We claim:

1. A local area network system utilizing a plurality of discrete multitone (DMT) remote units in communication with a central office providing digital subscriber line service comprising:

a DMT transceiver central office unit;

a master DMT transceiver remote unit connected to a local area network, wherein the master DMT transceiver remote unit provides a local area network timing reference for at least one other DMT transceiver remote unit when the DMT transceiver central office unit is not available;

a set of DMT carriers providing a DMT communication link between the DMT transceiver central office unit and the master DMT transceiver remote unit;

a slave DMT transceiver remote unit connected to the local area network; and a set of local area network carriers providing a local area network communication link between the slave DMT transceiver remote unit and the master DMT transceiver remote unit using timing derived from the set of DMT carriers providing a communication link between the master DMT transceiver remote unit and the DMT transceiver central office unit when the DMT transceiver central unit is available.

2. The network in claim 1 wherein the set of local area network carriers providing the local area network communication link between the slave DMT transceiver remote unit and the master DMT transceiver remote unit are adjacent to the set of DMT carriers providing the DMT communication link between the DMT transceiver central office unit and the master DMT transceiver remote unit.

3. A local area network system utilizing a plurality of asymmetric digital subscriber line (ADSL) remote units in communication with a central office providing digital subscriber line service comprising:

an ADSL transceiver central office unit;

a master ADSL transceiver remote unit connected to a local area network;

a plurality of ADSL carriers having frequencies within an ADSL frequency spectrum providing an ADSL communication link between the ADSL transceiver central office unit and the master ADSL transceiver remote unit;

a slave ADSL transceiver remote unit connected to the local area network; and a set of local area network carriers providing a local area network communication link between the slave ADSL transceiver remote unit and the master ADSL transceiver remote unit using timing derived from the plurality of ADSL carriers providing a communication link between the master ADSL transceiver remote unit and the ADSL transceiver central office unit, wherein the set of local area network carriers utilize a bin spacing equal to the bin spacing of the set of DMT carriers providing a DMT communication link between the DMT transceiver central office unit and the master DMT transceiver remote unit.

4. The network in claim 3 wherein the set of local area network carriers providing the local area network communication link between the slave ADSL transceiver remote unit and the master ADSL transceiver remote unit are adjacent to the plurality of ADSL carriers providing the ADSL communication link between the ADSL transceiver central office unit and the master ADSL transceiver remote unit.

5. The network in claim 3 wherein the ADSL frequency spectrum is comprised of the frequencies between 25 kHz and 552 kHz.

6. The network in claim 3 wherein the set of local area network carriers utilizing a frequency spectrum is comprised of the frequencies between 552 kHz and 1.104 MHz.

7. The network in claim 3 wherein the set of local area network carriers are coordinated by the slave DMT transceiver remote unit and the master DMT transceiver remote unit.

8. A discrete multitone (DMT) transceiver remote unit for communicating with at least one other DMT transceiver remote unit and capable of communicating with a central office comprising:
  a DMT transceiver capable of communicating with the central office and with the at least one other DMT transceiver remote unit, wherein the DMT transceiver generates and receives time domain signals having a set of carriers; and
  a controller in connection with the DMT transceiver, wherein the controller allocates a set of local area network carrier frequencies providing communication with the at least one other DMT transceiver remote unit, wherein the controller provides a local area network timing reference for the at least one other DMT transceiver remote unit when the central office is unavailable.

9. The DMT transceiver remote unit of claim 8 wherein the DMT transceiver remote unit is adaptable to exist as a master DMT transceiver remote unit or a slave DMT transceiver remote unit.

10. The DMT transceiver remote unit of claim 8 wherein the set of local area network carrier frequencies include idle carrier frequencies within a DSL frequency spectrum.

11. The DMT transceiver remote unit of claim 8 wherein the set of local area network carrier frequencies are within a local area network frequency spectrum adjacent to a DSL frequency spectrum.

12. A method for communicating with at least one other digital subscriber line (DSL) transceiver remote unit and capable of communicating with a central office comprising:
  determining if a DSL transceiver remote unit having a DMT transceiver is a master, and if so;
  determining if there is communication with a DSL central office unit, and if so;
  locking a transmit and a receive sampling clock of the DMT transceiver to a transmit sampling clock of the central office;
  aligning a first DMT transmit symbol of the DMT transceiver with a second DMT transmit symbol received from the central office;
  coordinating a set of local area network carrier frequencies with the at least one other DSL transceiver remote unit providing a communication link with the at least one other DSL transceiver remote unit;
  determining if there is communication with the DSL central office unit, and if not;
  transmitting a network timing reference providing a local area network timing reference for the at least one other DSL transceiver remote unit; and
  coordinating the set of local area network carrier frequencies with the at least one other DSL transceiver remote unit providing communication with the at least one other DSL transceiver remote unit.

13. A method for communicating with at least one other digital subscriber line (DSL) transceiver remote unit and capable of communicating with a central office comprising:
  determining if a DSL transceiver remote unit having a DMT transceiver is a master, and if so;
  determining if there is communication with a DSL central office unit, and if so;
  locking a transmit and a receive sampling clock of the DMT transceiver to a transmit sampling clock of the central office;
  aligning a first DMT transmit symbol of the DMT transceiver with a second DMT transmit symbol received from the central office;
  coordinating a set of local area network carrier frequencies with the at least one other DSL transceiver remote unit providing a communication link with the at least one other DSL transceiver remote unit;
  determining if the DSL transceiver remote unit having the DMT transceiver is the master, and if not;
  locking the transmit and the receive sampling clock of the DMT transceiver to the transmit sampling clock of the DSL transceiver unit central office;
  aligning the first DMT transmit symbol of the DMT transceiver with the second DMT transmit symbol received from the master DSL transceiver remote unit; and
  coordinating the set of local area network carrier frequencies with the at least one other DSL transceiver remote unit providing the communication link with the at least one other DSL transceiver remote unit.

14. A method for communicating with at least one other digital subscriber line (DSL) transceiver remote unit and capable of communicating with a central office comprising:
  determining if a DSL transceiver remote unit having a DMT transceiver is a master, and if so;
  determining if there is communication with a DSL central office unit, and if so;
  locking a transmit and a receive sampling clock of the DMT transceiver to a transmit sampling clock of the central office;
  aligning a first DMT transmit symbol of the DMT transceiver with a second DMT transmit symbol received from the central office;
  coordinating a set of local area network carrier frequencies with the at least one other DSL transceiver remote unit providing a communication link with the at least one other DSL transceiver remote unit;
  determining if the DSL transceiver remote unit having the DMT transceiver is the master, and if not;
  locking the transmit and the receive sampling clock of the DMT transceiver to the transmit sampling clock of the master DSL transceiver remote unit;

aligning the first DMT transmit symbol of the DMT transceiver with the second DMT transmit symbol received from the master DSL transceiver remote unit; and coordinating the set of local area network carrier frequencies with the at least one other DSL transceiver remote unit providing the communication link with the at least one other DSL transceiver remote unit.

15. A method for communicating with at least one other digital subscriber line (DSL) transceiver remote unit and capable of communicating with a central office comprising:

determining if a DSL transceiver remote unit having a DMT transceiver is a master, and if so;

determining if there is communication with a DSL central office unit, and if so;

locking a transmit and a receive sampling clock of the DMT transceiver to a transmit sampling clock of the central office;

aligning a first DMT transmit symbol of the DMT transceiver with a second DMT transmit symbol received from the central office;

coordinating a set of local area network carrier frequencies with the at least one other DSL transceiver remote unit providing a communication link with the at least one other DSL transceiver remote unit;

determining if the DSL transceiver remote unit having the DMT transceiver is the master, and if not;

locking the transmit and the receive sampling clock of the DMT transceiver to the transmit sampling clock of the master DSL transceiver remote unit;

aligning the first DMT transmit symbol of the DMT transceiver with the second DMT transmit symbol received from the DSL transceiver unit central office; and coordinating the set of local area network carrier frequencies with the at least one other DSL transceiver remote unit providing the communication link with the at least one other DSL transceiver remote unit.

16. A method for communicating with at least one other digital subscriber line (DSL) transceiver remote unit and capable of communicating with a central office comprising:

determining if a DSL transceiver remote unit having a DMT transceiver is a master, and if so;

determining if there is communication with a DSL central office unit, and if so;

locking a transmit and a receive sampling clock of the DMT transceiver to a transmit sampling clock of the central office;

aligning a first DMT transmit symbol of the DMT transceiver with a second DMT transmit symbol received from the central office;

coordinating a set of local area network carrier frequencies with the at least one other DSL transceiver remote unit providing a communication link with the at least one other DSL transceiver remote unit;

determining if the DSL transceiver remote unit having the DMT transceiver is the master, and if not;

locking the transmit and the receive sampling clock of the DMT transceiver to the transmit sampling clock of the DSL transceiver unit central office;

aligning the first DMT transmit symbol of the DMT transceiver with the second DMT transmit symbol received from the DSL transceiver unit central office; and coordinating the set of local area network carrier frequencies with the at least one other DSL transceiver remote unit providing the communication link with the at least one other DSL transceiver remote unit.

17. A computer readable medium having stored therein instructions for causing a central processing unit to execute the method of claim 12.

18. A computer readable medium having stored therein instructions for causing a processor to execute the method of claim 13.

19. A computer readable medium having stored therein instructions for causing a processor to execute the method of claim 14.

20. A computer readable medium having stored therein instructions for to execute the method of claim 15.

21. A computer readable medium having stored therein instructions for causing a processor to execute the method of claim 16.

* * * * *